United States Patent Office 3,234,189
Patented Feb. 8, 1966

3,234,189
PROCESS FOR CROSS-LINKED POLYSULFONE POLYMERS
Irving Tashlick, Springfield, Mass., and Harry M. Culbertson, Los Gatos, Calif., assignors to Monsanto Company, St. Louis, Mo., a corporation of Delaware
No Drawing. Filed Nov. 14, 1960, Ser. No. 68,660
12 Claims. (Cl. 260—79.3)

The present invention is directed to production of sulfone polymers and more particularly to cross-linked polymers of this type.

Sulfone or sulfonyl polymers are those which contain sulfone

groups in the polymer backbone. As a class they are generally known. Of the sulfone polymers presently known, those of particular interest are obtained from reacting stoichiometric equivalents of a donor compound represented by the formula:

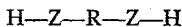

with an acceptor compound represented by the formula:

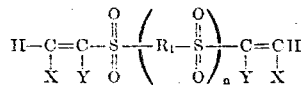

The polymers obtained as a result are linear in nature and can be represented by the formula:

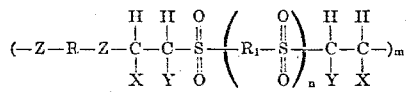

Throughout the representation above, R designates a divalent organic radical, $R_1$ a divalent aliphatic radical free of functional groups, X and Y radicals selected from the class consisting of hydrogen, alkyl and aryl radicals, Z designates a component selected from the class consisting of oxygen and sulfur and $m$ is an integer designating the number of repeating polymer units and $n$ is 0 or 1. The linear polymers so produced are thermoplastic in nature. They have utility as molding compositions, films, fibers, etc. However, in that they do not readily cross-link, they will not exhibit solvent and heat resistance.

Accordingly, it is a principal object of the present invention to produce readily cross-linkable sulfone polymers.

Another object is to produce cross-linked or thermoset sulfone polymers.

Another object is that of obtaining sulfone polymers exhibiting improved properties of solvent and heat resistance, as well as dimensional stability.

Other objects of the invention will in part be obvious and will in part appear hereinafter.

These and other objects of the present invention can be attained through practice of a process which comprises the steps of (A) forming a cross-linkable pre-polymer mixture, the sulfone polymer molecules of which contain at least two vinyl-sulfone groups, by reacting a sulfone starting material or acceptor component selected from the class consisting of monosulfones represented by the formula:

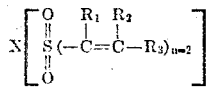

and polysulfones represented by the formula:

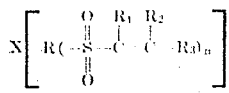

with less than a stoichiometric quantity of an active hydrogen-containing compound or donor component selected from the class consisting of polyhydric alcohols, polyhydric thiols and mono-substituted amines represented by the formula:

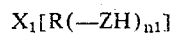

and amines represented by the formula:

the said quantity being such that the ratio of $n.X$ to $n_1.X_1$ is greater than unity,

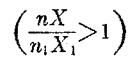

and wherein $n$ and $n_1$ represent integers of at least 2 and X and $X_1$ represent numbers of moles of each reactant and thereafter (B) cross-linking the said sulfone pre-polymer mixture to provide a thermoset polymer by reacting the same in the presence of a basic catalyst with a hydroxyl containing compound selected from the class consisting of polyols and water except that when the number of vinyl sulfone groups contained in the said pre-polymer are two in number, the polyol must contain more than two hydroxyl groups, and wherein throughout the said process R is selected from the class consisting of organic radicals having a valence of 2–6 and free of reactive functional groups $R_1$, $R_2$ and $R_3$ are selected from the class consisting of hydrogen, alkyl and aryl radicals, and Z is selected from the class consisting of monosubstituted nitrogen, oxygen and sulfur.

The following examples are entered in illustration of the invention. Where parts are mentioned, parts by weight are intended unless otherwise described.

EXAMPLE I

A. Pre-polymer preparation

Two solutions, the one constituted of 21.27 g. (0.18 mole) divinyl sulfone dissolved in 15 ml. of 1,2 dimethoxyethane and the second 9.55 g. (0.09 mole) diethylene glycol and 2.76 g. (0.03 mole) glycerine dissolved in 20 ml. 1,2 dimethoxyethane are prepared under essentially anhydrous conditions. About 5 ml. of the second or glycol solution is first reacted with 0.02 g. of sodium hydride and the reaction product which results serves as a basic catalyst which is slowly added to the divinyl sulfone solution. The remainder of the glycol solution is added over a period of 30 minutes. The reaction is exothermic in nature and the temperature is maintained between 30°–40° C. by positive cooling. After addition is complete, the resulting solution is maintained under stirring for an hour. Thereafter, 4 drops of acetic acid plus a few crystals of hydroquinone are added to stabilize the resulting resin against further reaction. At that point, the remaining solvent is removed under vacuum of 30 mm. Hg at 40° C. The residue which remains is a light yellow viscous oil which absorbs about 20% by weight of water, is soluble in acetone, and insoluble in dioxane, benzene, ethanol, and tetrahydrofuran. When the IR spectrum of the pre-polymer is taken and compared to that of the unreacted starting mixture, it evidences marked reduction in hydroxyl group absorption, strong absorption due to new ether linkages and retention of some vinyl linkages. The pre-polymer resin contains molecules calculated to have a molecular weight of about 1,100 and three vinyl-sulfone groups.

B. Cross-linking step

Eleven grams of the pre-polymer product above is stirred with 0.55 g. of 1.0% aqueous solution of potassium hydroxide to provide a viscous liquid. This is cast onto a glass plate and cures to a rubbery film in 10 hours under room conditions.

The film is removed from the plate and placed in a quantity of acetone. After 24-hour immersion, the film is slightly swollen, but remains undissolved, attesting to its thermoset condition.

EXAMPLE II

A. Pre-polymer preparation

A solution of 0.015 g. (0.000625 mole) of sodium hydride dissolved in 16.22 g. (0.18 mole) of 1,4-butanediol is prepared. This solution is slowly added to a stirred flask containing 28.36 g. (0.24 mole) divinyl sulfone. After the addition of 5–7 ml. of the 1,4-butanediol solution there is a rapid rise in temperature from 24° C. to 90° C. The addition of 1,4-butanediol solution is continued under stirring at a rate designed to maintain the temperature between 70° C. and 90° C. When addition is complete, the reaction mixture is heated to 120° C. and held at that temperature for 2 hours. The mixture is then cooled to room temperature, and is then observed to be a light yellow to colorless viscous syrup which may be poured at room temperature.

An analysis of the hydroxyl content of the pre-polymer mixture by acetylation with acetic anhydride in pyridine shows that 95% of the hydroxyl groups originally present have been reacted. The average molecular weight of the pre-polymer molecules is calculated to be about 700 and contain two vinyl-sulfone groups. When tested by IR spectrum analysis the presence of free vinyl groups and ether linkages is evidenced.

B. Cross-linking step

One-tenth gram of potassium tertiary butoxide is dissolved in 0.5 g. (0.0033 mole) of triethanolamine. This solution is added to 3.71 g. of the pre-polymer obtained above. Initially, the mixture darkens in color and with increased stirring turns dark amber in color. The viscous liquid mass is poured into a mold and cured at 160° C. for 5 hours. After cooling to room temperature the molded form is removed from the mold. This is a light orange rubbery solid which does not flow when exposed to a temperature of 250° C. which fact evidences extensive cross-linking has taken place.

EXAMPLE III

A. Pre-polymer preparation

A solution of 0.015 g. (0.000625 mole) sodium hydride dissolved in 13.42 g. (0.10 mole) of 1,2,6-hexanetriol is prepared and is then slowly added to a stirred flask containing 29.54 g. (0.25 mole) of divinyl sulfone. After the addition of a few ml., an orange color appears followed by a sharp rise in temperature from 25° C. to 80° C. The reaction mixture then becomes colorless and addition is completed while maintaining the temperature between 65–100° C. The colorless syrup is stirred at 120 C. for 2 hours and cooled to give a clear, colorless, tacky syrup which flows stiffly at room temperature.

Acetylation values of the syrup with acetic anhydride in pyridine indicate that 88% of the hydroxyl groups originally present have been reacted. When tested by IR spectrum analysis the presence of free vinyl groups and ether linkage is noted. The pre-polymer molecules are calculated to have greater than two vinyl-sulfone groups.

B. Cross-linking step

An 8.59 g. portion of the pre-polymer product is mixed with 2.12 g. of a solution of 0.5% potassium hydroxide in diethylene glycol. The mixture is cast as a film on a polished metal plate and cured for 4 hours at 120° C. The film on cooling, is a tough, flexible material which resists tearing, and evidences an amber coloration.

EXAMPLE IV

A. Pre-polymer preparation

A solution of 0.08 g. (0.0007 mole) of potassium tertiary butoxide dissolved in 17.31 g. (0.16 mole) 1,3-propanedithiol is slowly added to a stirred flask containing 23.63 g. (0.20 mole) of divinyl sulfone. After the addition of a few ml. of the dithiol solution the temperature rises slowly. Addition is continued over a period of about 1 hour and the reaction mixture is heated to 100° C. and held at this temperature for an hour. On cooling, the resulting product is a viscous oil.

The pre-polymer is tested to assess the percentage of thiol groups reacted by titration with silver nitrate. The results show 98% of these groups reacted. IR spectrum analysis registers the presence of vinyl groups. The number of vinyl-sulfone groups per pre-polymer molecule is calculated at two.

B. Cross-linking step

A 10.29 g. portion of the resin above is treated with 0.69 g. of 1.0% solution of potassium hydroxide in glycerine. The mass gells immediately to a tacky-rubbery mass exhibiting excellent adhesive properties, together with resistance to attack by acetone and other organic solvents.

EXAMPLE V

A. Pre-polymer preparation

A solution of 15.54 g. (0.18 mole) piperazine dissolved in 75 ml. warm dioxane, is slowly added with stirring to 28.36 g. (0.24 mole) of divinyl sulfone. An exothermic reaction results on addition, and after addition is complete the reaction mixture is refluxed for 1 hour at atmospheric pressure. On evaporation of the solvent, a viscous liquid remains. When the IR spectrum of this liquid is taken the (a) presence of free vinyl groups and (b) virtual absence of secondary amine groups is noted. The molecular weight can be calculated as about 730. The number of vinyl-sulfone groups per pre-polymer molecule is calculated to be two.

B. Cross-linking step

A 7.3 g. portion of the pre-polymer resin above is dissolved in 30 ml. of dry acetone. Trimethylol-propane in the amount of 0.9 g. (0.0068 mole) is then dissolved in the acetone solution followed by addition of 0.3 ml. of a 10% solution of potassium tertiary butoxide in tetrahydrofuran. The liquid is then cast as a film onto the surface of a polished metal plate and allowed to dry at room temperature for a period of 12 hours The resulting tacky film is then cured by heating for two hours at 150° C. in a circulating air oven to give a tough, glossy film which tightly adheres to the metal plate, and which resists the action of water at 100° C.

EXAMPLE VI

A. Pre-polymer preparation

A mixture of 15.01 g. (0.10 mole) of triethylene glycol, 66.8 g. of (0.20 mole) 4,4'-di(vinylsulfonyl)diphenyl is added to 200 ml. of dimethoxyethane and heated to boiling. The mixture is cooled to 40° C. and 1 ml. of a 10% solution of potassium tertiary butoxide in tetrahydrofuran is added with vigorous agitation to give an exothermic reaction. The solution is then heated to reflux and so maintained for 2 hours. On evaporation of the solvent, an extremely viscous liquid is isolated which solidifies to a low melting solid on standing for a week.

When subjected to IR spectrum analysis, the liquid resin product evidences (a) the presence of free vinyl groups and (b) an increase in ether linkages over those evidenced in the starting materials. Acetylation values of the liquid product by the acetic acid and pyridine method indicate that 8% of the hydoxyl groups remain unreacted. The number of vinyl-sulfone groups retained in the pre-polymer molecules is calculated as two.

B. *Cross-linking step*

A mixture of 0.5 g. (0.0037 mole) of trimethylol propane and 0.3 g. (0.0033 mole) of glycerine is warmed to 150° C. and is then added together with stirring to 8.18 g. of the pre-polymer product above. A clear solution results. With stirring, 0.15 ml. of 10% solution of potassium tertiary butoxide in tetrahydrofuran is added to the solution. The solution is then added to a bar mold and the temperature raised to 50° C. followed after 30 minutes by raising again to 120° C. and the latter temperature maintained for 4 hours. The mold is allowed to cool to room temperature. The cast bar is removed and is observed to be a hard, dimensionally stable form which is infusible up to the point of decomposition.

EXAMPLE VII

A. *Prepolymer preparation*

A 1.74 g. (0.02 mole) portion of n-amylamine is added to a mixture of 9 g. (0.03 mole) of 2,4 di(propenylsulfonyl)toluene in 60 ml. of dioxane at room temperature. This is paralleled by a rise in temperature up to 40° C. After addition is complete, the reaction mixture is refluxed for 60 minutes. Thereafter, solvent is evaporated at 30 mm. Hg and 50° C. The residue which remains is an extremely viscous amber liquid resin product which when tested exhibits presence of free vinyl groups, and a trace of unreacted amino hydrogen. The molecular weight of the product is about 1000.

B. *Cross-linking step*

To a 5.37 g. portion of the resin produced above, is added 0.3 g. of a 70% aqueous sorbitol solution containing 5% KOH. The mixture is poured into a bar-shaped mold and a temperature of 100° C. applied for 3 hours. The mold is cooled and the cast bar removed. The bar is firm and resilient and has a dark coloration.

The present invention is directed to a two-step process by which to produce thermoset sulfone polymers. In the first step, a cross-linkable pre-polymer mixture is produced, which contains at least two vinyl-sulfone groups in the molecules thereof. This is followed by the second step in which the prepolymer is cross-linked to produce the desired thermoset sulfone polymers.

More particularly, the process of the present invention constitutes the steps of (A) forming a cross-linkable pre-polymer mixture comprising sulfone polymer molecules containing at least two vinyl sulfone groups in the said molecules, by reacting a sulfone starting material or acceptor component selected from the class consisting of monosulfones represented by the formula:

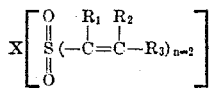

and polysulfones represented by the formula:

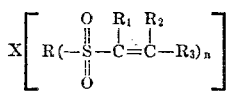

with less than a stoichiometric quantity of an active hydrogen-containing compound or donor component selected from the class consisting of polyhydric alcohols, polyhydric thiols and mono-substituted amines represented by the formula:

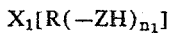

and amines represented by the formula:

the said quantity being such that the ratio of $n \cdot X$ to $n_1 \cdot X_1$ is greater than unity

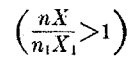

and wherein $n$ and $n_1$ represent integers of at least 2 and X and $X_1$ represent numbers of moles of each reactant and thereafter (B) cross-linking the said sulfone prepolymer mixture by reacting the same in the presence of a basic catalyst with a hydroxyl containing compound selected from the class consisting of polyols and water except that when the number of vinyl-sulfone groups contained in the molecule of the said prepolymer are two in number the polyol must contain more than two hydroxyl groups, and wherein throughout the said process R is selected from the class consisting of organic radicals having a valence of 2–6 and free of reactive functional groups $R_1$, $R_2$ and $R_3$ are selected from the class consisting of hydrogen, alkyl and aryl radicals, and Z is selected from the class consisting of monosubstituted nitrogen, oxygen and sulfur.

A. *Discussion of Step A directed to the production of a cross-linkable sulfone pre-polymer*

The sulfone starting material, or acceptor compounds used in production of the pre-polymer contains a sulfone group

group or groups adjacent to terminal ethylenic

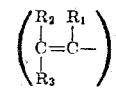

groups. Wherein $R_1$, $R_2$ and $R_3$ represent hydrogen, alkyl or aryl radicals.

The first of these sulfone starting materials are the monosulfones which can be represented by the formula:

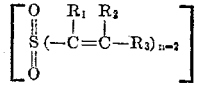

wherein $R_1$, $R_2$ and $R_3$ are selected from the class consisting of hydrogen, alkyl and aryl groups. In the case of monosulfones, then a single sulfone group separates two terminal ethylenic groups. Specific examples of the monosulfones include divinyl sulfone, propenyl sulfone, isopropenyl sulfone, (alpha-ethyl vinyl)sulfone, (alpha-n-propyl vinyl)sulfone, 1-butenyl sulfone, (alpha-phenyl vinyl) sulfone, styryl sulfone, etc.

The polysulfone starting materials can be represented by the formula:

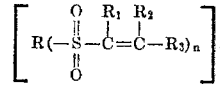

wherein R is selected from the class consisting of organic radicals having a valence of 2–6 and free of functional groups, $R_1$, $R_2$ and $R_3$ are selected from the class consisting of hydrogen, alkyl and aryl groups and $n$ represents an integrer of at least 2. The polysulfone starting materials then contain greater than one sulfone group. Specific examples of the polysulfone starting materials include 1,4-bis(vinyl sulfonyl)butane, bis(beta,beta'-vinyl sulfonyl)ethyl ether, 4,4' di(vinyl sulfonyl)diphenyl, 2,4,6-tri(vinylsulfonyl)toluene, 2,2',4,4' - tetra(vinylsulfonyl) diphenyl, 1,2-di(vinylsulfonylmethoxy)ethane, etc.

The active hydrogen containing compound or donor component which is reacted with the acceptor compound in order to produce the pre-polymer can be selected from the class consisting of polyhydric alcohols, polyhydric iols and monosubstituted amines represented by the formula:

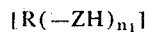

and amines represented by the formula:

Specific donor compounds include within the polyhydric alcohols; ethylene glycol, 2,3-butylene glycol, diethylene glycol, tetramethylene glycol, decamethylene glycol, glycerine, hydroquinone, resorcinol, catechol, 4,4'-dihydroxy diphenylmethane, phloroglucinol, thiodiglycol, bis-beta-hydroxyethyl)sulfoxide, bis-(beta-hydroxyethyl) sulfone, bis-(beta-hydroxyethyl)adipamide; the polythiols: bis-(beta-mercaptoethyl)adipate, ethylene dithiol, triethylene dithiol, decamethylene dithiol, bis-(2-thiol ethyl)ether, 2-thiol ethanol; as well as monosubstituted amines such as: 1,6-hexamethylene diamine, p-xylene diamine, 1,3-propane diamine, p-phenylene diamine; and amines represented specifically by: piperazine, tetraethylene triamine, N,N'-diethyl phenylene diamine, N,N'-dimethyl ethylene diamine, and mixtures of the same.

In the formation of the pre-polymer, the acceptor component is reacted with specifically less than a stoichiometric quantity of donor component. In this manner, the pre-polymer molecules which result from the reaction will contain at least two vinyl-sulfone groups. With the occurrence of side chains on the pre-polymer molecules the number of vinyl-sulfone groups can be greater than two in number.

The prescribed reactions can be illustrated relative to specific instances. First, in relation to a monosulfone starting material:

Throughout the generic representation above, R represents an organic radical having a valence of 2–6 and free of reactive functional groups, $R_1$, $R_2$ and $R_3$ represent hydrogen, alkyl or aryl radicals, Z represents monosubstituted nitrogen, oxygen or sulfur, $n$ and $n_1$ represent integers of at least 2 and X and $X_1$ represent numbers of mols of the sulfone starting material and active hydrogen contributing compound, respectively.

The pre-polymer formation reaction is catalytic in nature when the donor component is a polythiol, polyol or water, when the latter two are involved a strong basic catalyst is used. Strong bases which are useful as catalysts here include quaternary ammonium hydroxides, such as trimethyl benzyl ammonium hydroxide; alkali and alkaline earth metals, oxides, hydroxides, hydrides and carbonates as exemplified by potassium, potassium hydroxide, sodium hydride and potassium carbonate, potassium tertiary butoxide, butyl lithium, calcium oxide, barium oxide, etc. The amounts of the strong basic catalysts to be used are preferably minute, as little as 0.01 of mole percent on the total moles of reactants can be used. However, when the donor is a polythiol a weak basic catalyst is recommended such as tributyl amine, N,N'-dimethylbenzyl amine, etc. The amount used in the latter case can be on the order of 0.1 of a mole percent of the total number of moles of reactants. When the donor component is an amine no catalyst is needed.

The pre-polymer formation reaction can be carried out at any convenient temperature and pressure. The reaction is exothermic and necessary precautions should be exercised. Heating can be carried out after the reaction is no longer exothermic in order to insure completion of

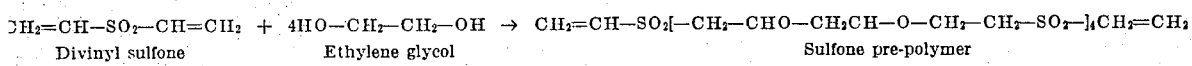

Then with respect to a polysulfone starting material:

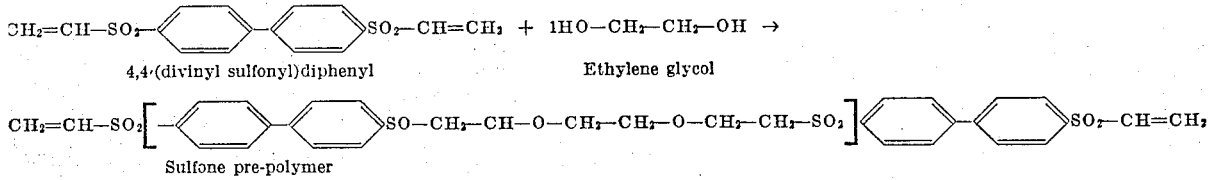

These specific instances can be represented then in a generic fashion. Taking the first instance above, and assigning the values there as follows $X=5$, $n=2$, $X_1=4$ and $n_1=2$ then the ratio $$\frac{Xn}{X_1n_1}=\frac{10}{8}>1$$

The generic reproduction for the reaction then is as follows:

reaction and expenditure of reactants. The reaction can be carried out in non-reactant solvents such as dioxane, acetone, chloroform, benzene, etc. or in mass. The pre-polymer can be retained in the solvent, when the same is used, or extracted from the same.

Additives and adducts can be used to stabilize the pre-polymer mixture, as for instance by addition of sufficient acid to neutralize the basic catalyst. Since the pre-

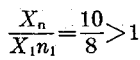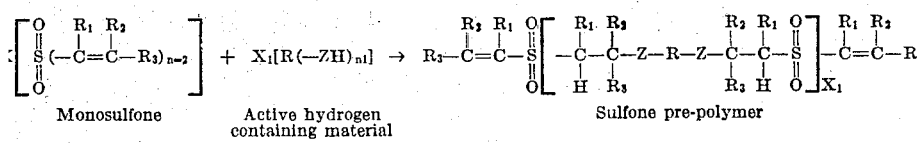

In similar fashion with respect to the reaction of the polysulfone above, the values for $X=2$, $n=2$, $X_1=1$ and the $n_2=2$ and the ratio $$\frac{Xn}{X_1n_1}=\frac{4}{2}>1$$

This reaction can be generically represented as:

polymer mixture contains free vinyl groups in the molecules thereof, free radical inhibitors such as hydroquinone, tertiary butyl catechol, etc. can be used to advantage where cross-linking of the pre-polymer is to be postponed. It bears emphasis that the pre-polymer mixture to be effective for later cross-linking must contain these free vinyl or more particularly free vinyl-sulfone groups.

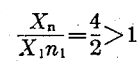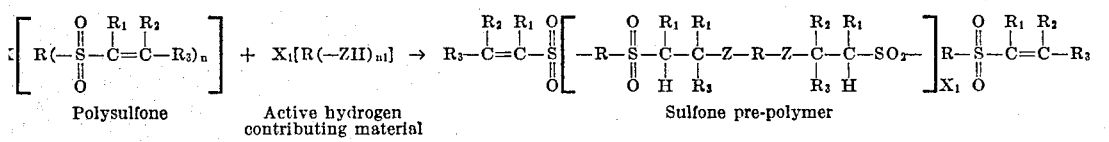

The pre-polymer mixture is made up of low molecular weight polymer molecules containing free vinyl-sulfone groups. This gives a pre-polymer mixture which is either (a) liquid in nature or (b) easily dissolved in solvents such as water or organic solvents to give liquids, in either case having relatively low viscosities facilitating handling of the same preparatory to their being cross-linked. For this reason, they can be poured easily into molds, interstices, onto laminate substrates etc., anticipatory to their being cross-linked into a permanent, hardened condition. Specifically the pre-polymers should have molecular weights ranging from 300 to 5,000.

B. Cross-linking step

The sulfone pre-polymer, constituted of low molecular weight polymers and containing free vinyl-sulfone groups in the polymer molecules thereof is cross-linked by reacting the same with preferably 50–150% of a stoichiometric quantity of a hydroxyl containing compound selected from the class consisting of polyols and water.

The hydroxyl containing compounds relied upon for cross-linking include in addition to water, the polyols, first of which are the diols represented by ethylene glycol, triethylene glycol, 1,3-propylene glycol, 2,3-butylene glycol, 1,5-pentanediol, 1,6-hexamethylene glycol, hydroquinone, para-xylene glycol, resorcinol, catechol, dihydroxyethyl sulfide, etc.; triols represented by triethanolamine, glycerine, 1,2,6-hexanetriol, 1,1,1-trimethylol propane, phloroglucinol, pyrogallol, etc.; and polyols containing greater than 3 hydroxyl groups as represented by pentaerythritol, dextrose, sorbitol, inositol, etc. Preference is directed to primary polyols containing 2–4 hydroxyl groups and mixtures of the same. Note in this regard that when the prepolymer constitutes molecules containing two vinyl-sulfone groups, that the hydroxyl containing compound used must contain three or more hydroxyl groups. Aside from that any polyol, respective of the number of hydroxyl groups can be used.

As indicated previously, the hydroxyl containing compounds are preferably used in the amounts of 50–150% of the stoichiometric quantity as determined by the number of free vinyl-sulfonyl groups in the prepolymer molecule. Actually, more or less can be used. However, when less than 50% is used, less than the desired amount of cross-linking takes place, while amounts greater than 150% increase in cross-linking is insignificant, and, rather becomes uneconomical both from the standpoint of material balance and aftertreatment, the latter refers to the possibility that removal of cross-linking agent would become necessary.

The cross-linking step is dependent upon the use of strong basic or alkali catalysts. These will include alkali and alkaline earth metal catalysts, such as potassium hydroxide, potassium tertiary butoxide, sodium hydroxide, calcium hydroxide, butyl lithium, barium hydroxide, strontium oxide, cesium oxide, as well as these metals themselves and salts such as the carbonates of the same. Additional strong basic catalysts which are intended quaternary ammonium hydroxides such as tetramethylammonium hydroxide, triethylbenzyl ammonium hydroxide, etc. The preferred catalysts are those which are soluble in the pre-polymer resins such as alkali alkoxides, more particularly sodium methoxide and ethoxide, potassium tertiary butoxide, butyl lithium, etc. The amount of catalyst can be rather small, preferably ranging 0.01%–1.0% of the total weight of pre-polymer and cross-linking agent.

The cross-linking steps can be practiced in any convenient manner and location. The pre-polymer mixtures can be used directly as obtained from the formation reaction, or the pre-polymer molecules can be extracted from the reaction mixture and used, or in either case the prepolymer can be dissolved, suspended or otherwise carried in a liquid or other medium, and in each case can be mixed with the cross-linking agent and catalyst. Once the ingredients are mixed heat can be applied to initiate or facilitate the cross-linking reaction, however, in most cases it is not required to do so. Pressure as well as temperature can be used if desired during the cross-linking reaction.

The cross-linking reaction can be carried out in any convenient location, such as molds when thermoset castings, and shapes are to be made, material interstices, surfaces and interfaces when laminating and adhering activities are carried on.

The cross-linked sulfone polymers which eventuate from practice of the present invention have broad utility in application where qualities of thermosetting, dimensional stability and solvent resistance are desired. These will include moldings, castings, films, fibers, etc.

It will thus be seen that the objects set forth above, among those made apparent from the preceding description, are efficiently attained and, since certain changes may be made in the above products and in carrying out the process by which they are obtained without departing from the scope of the invention, it is intended that all matter contained in the above description shall be interpreted as illustrative and not in a limiting sense.

What is claimed is:

1. A process for producing cross-linked sulfone polymers which comprises the steps of (A) forming a cross-linkable pre-polymer mixture comprising sulfone polymer molecules having molecular weight of 300–5,000 and containing at least two vinyl-sulfone groups in said molecules, by reacting a sulfone starting material selected from the class consisting of monosulfones represented by the formula:

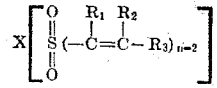

and polysulfones represented by the formula:

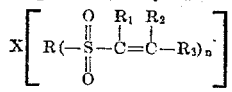

with less than a stoichiometric quantity of an active hydrogen-containing compound selected from the class consisting of polyhydric alcohols and polyhydric thiols represented by the formula:

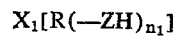

and mixtures of the same, the said quantity being such that the ratio of $n.X$ to $n_1.X_1$ is greater than unity $$\left(\frac{nX}{n_1X_1} > 1\right)$$

and wherein $n$ and $n_1$ represent integers of at least 2 and $X$ and $X_1$ represent numbers of mols of each reactant, and, thereafter (B) cross-linking the said sulfone prepolymer mixture by reacting the same in the presence of a basic catalyst with a hydroxyl-containing compound selected from the class consisting of polyols and water, except that when the number of vinyl-sulfone groups contained in the said pre-polymer are two in number the polyol must contain more than two hydroxyl groups, and wherein throughout both steps of the said process R is selected from the class consisting of organic radicals having a valence of 2–6 and free of reactive functional groups, $R_1$, $R_2$ and $R_3$ are selected from the class consisting of hydrogen, alkyl and aryl radicals, and $Z$ is selected from the class consisting of monosubstituted oxygen and sulfur.

2. The process according to claim 1 wherein the starting material is divinyl sulfone.

3. The process according to claim 1 wherein the active hydrogen containing compound is a primary polyhydric alcohol.

4. The process according to claim 1 wherein the hydroxyl containing compound is a polyfunctional primary alcohol containing 2–4 hydroxyl groups.

5. A process for providing a cross-linked sulfone polyner which comprises the steps of reacting divinyl sulfone with less than a stoichiometric quantity of diethylene glycol and glycerin to produce a pre-polymer having three vinyl-sulfone groups in the molecule of same and cross-linking the said prepolymer by reacting the same with water in the presence of potassium hydroxide.

6. A process for providing a cross-linked sulfone polymer which comprises the steps of reacting divinyl sulfone with less than a stoichiometric quantity of 1,4-butanediol to produce a pre-polymer having two vinyl-sulfone groups in the molecule of same, and, cross-linking the said pre-polymer by reacting the same with triethanolamine in the presence of potassium tertiary butoxide.

7. A process for providing a cross-linked sulfone polymer which comprises the steps of reacting divinyl sulfone with less than a stoichiometric quantity of 1,2,6-hexanetriol to produce a pre-polymer having greater than two vinyl-sulfone groups in the molecule of same, and, cross-linking the said pre-polymer by reacting the same with diethylene glycol in the presence of potassium hydroxide.

8. A process for providing a cross-linked sulfone polymer which comprises the steps of reacting divinyl sulfone with less than a stoichiometric amount of 1,3-propanedithiol to produce a pre-polymer having two vinyl-sulfone groups in the molecule of same, and, cross-linking the said pre-polymer by reacting the same with glycerine in the presence of potassium hydroxide.

9. A process for providing a cross-linked sulfone polymer which comprises the steps of reacting divinyl sulfone with less than a stoichiometric quantity of piperazine to produce a pre-polymer having two vinyl-sulfone groups in the molecule of the same, and, cross-linking the said pre-polymer by reacting the same with trimethylol propane in the presence of potassium tertiary butoxide.

10. A process for providing a cross-linked sulfone polymer which comprises the steps of reacting 4,4'-di(vinylsulfonyl)diphenyl with less than a stoichiometric quantity of triethylene-glycol to produce a pre-polymer having two vinyl-sulfone groups in the molecule of the same, and, cross-linking the said pre-polymer by reacting the same with a mixture of trimethylol propane and glycerine in the presence of potassium tertiary butoxide.

11. A cross-linked sulfone polymer produced by the process comprising the steps of (A) forming a cross-linkable pre-polymer mixture comprising sulfone polymer molecules having molecular weights of 300–5,000 and containing at least two vinyl-sulfone groups in said molecules, by reacting a sulfone starting material selected from the class consisting of monosulfones represented by the formula:

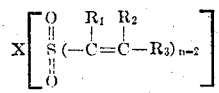

and polysulfones represented by the formula:

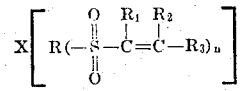

with less than a stoichiometric quantity of an active hydrogen containing compound selected from the class consisting of polyhydric alcohols and polyhydric thiols represented by the formula:

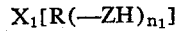

and mixtures of the same, the said quantity being such that the ratio of $n.X$ to $n_1.X_1$ is greater than unity $$\left(\frac{nX}{n_1X_1} > 1\right)$$

and wherein $n$ and $n_1$ represent integers of at least 2 and X and $X_1$ represent numbers of mols of each reactant and thereafter (B) cross-linking the said sulfone pre-polymer mixture by reacting the same in the presence of a basic catalyst with 50–150% of a stoichiometric quantity of a hydroxyl-containing compound selected from the class consisting of polyols and water, except that when the number of vinyl-sulfone groups contained in the said prepolymer is two in number, the polyol must contain more than two hydroxyl groups, and wherein throughout both steps of the said process R is selected from the class consisting of organic radicals having a valence of 2–6 and free of reactive functional groups, $R_1$, $R_2$ and $R_3$ are selected from the class consisting of hydrogen, alkyl and aryl radicals, and Z is selected from the class consisting of monosubstituted oxygen and sulfur.

12. Cross-linkable sulfone pre-polymer mixtures comprising sulfone polymer molecules having molecular weights of 300–5,000 and containing at least two vinyl-sulfone groups in said molecules, said pre-polymers being produced by reacting a sulfone starting material selected from the class consisting of monosulfones represented by the formula:

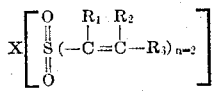

and polysulfones represented by the formula:

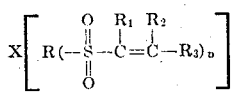

with less than a stoichiometric quantity of an active hydrogen containing compound selected from the class consisting of polyhydric alcohols and polyhydric thiols represented by the formula:

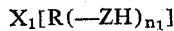

and mixtures of the same, the said quantity being such that the ratio of $n.X$ to $n_1.X_1$ is greater than unity $$\left(\frac{nX}{n_1X_1} > 1\right)$$

and wherein $n$ and $n_1$ represent integers of at least 2 and X and $X_1$ represent numbers of mols of each reactant, and wherein R is selected from the class consisting of organic radicals having a valence of 2–6 and free of reactive functional groups, $R_1$, $R_2$ and $R_3$ are selected from the class consisting of hydrogen, alkyl and aryl radicals, and Z is selected from the class consisting of monosubstituted oxygen and sulfur.

References Cited by the Examiner
UNITED STATES PATENTS 2,623,035  12/1952  Schappel _____ 260—79.3
3,031,435  4/1962  Tesoro _____ 260—79.3

FOREIGN PATENTS 650,742  2/1951  Great Britain.

JOSEPH L. SCHOFER, *Primary Examiner.*

H. BURSTEIN, J. LIBERMAN, LEON BERCOVITZ,
*Examiners.*